Patented Nov. 3, 1931                                                                    1,829,950

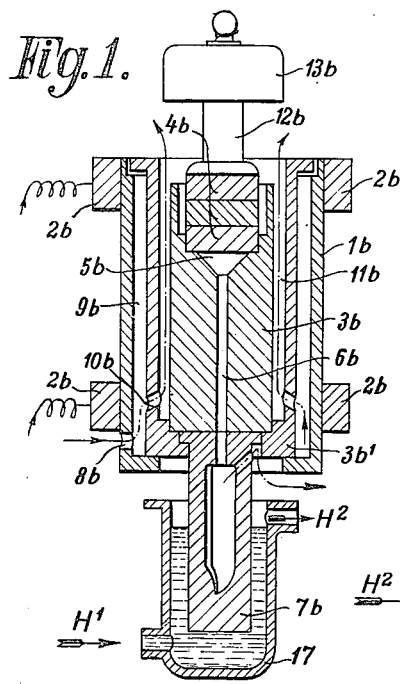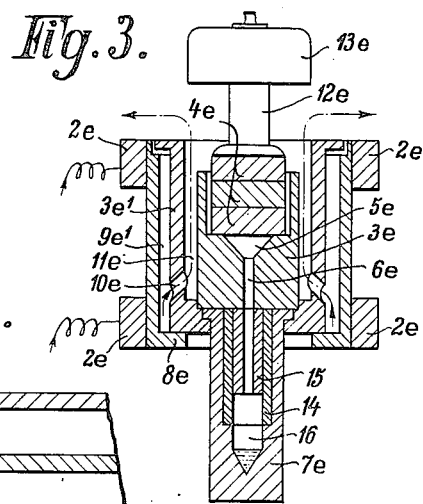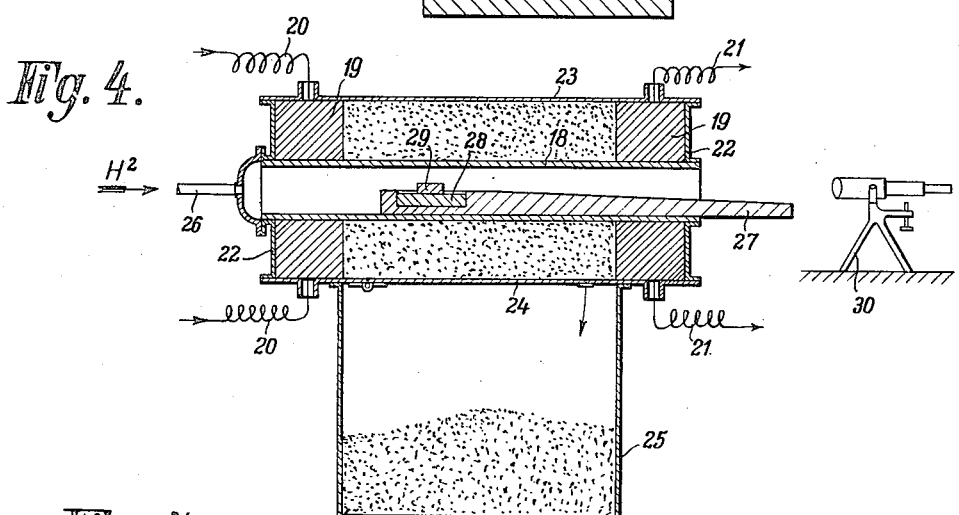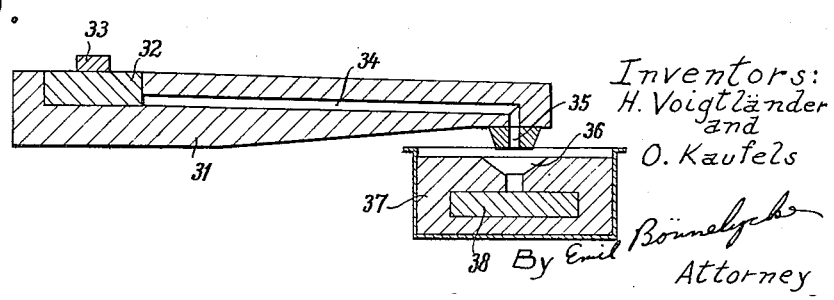

UNITED STATES PATENT OFFICE

HERMANN VOIGTLÄNDER AND OTTO KAUFELS, OF ESSEN, GERMANY, ASSIGNORS TO GEWERKSCHAFT WALLRAM ABTEILUNG METALLWERKE, OF ESSEN, GERMANY, A CORPORATION OF PRUSSIA

PROCESS FOR THE MANUFACTURE OF DIFFICULTLY MELTING HEAVY METALS

Application filed August 25, 1925, Serial No. 52,378, and in Germany September 8, 1924.

The present invention relates to a process for manufacturing carbides of difficultly meltable metals (tungsten, uranium, molybdenum, titanium, boron, zirconium etc.) according to which the mass to be melted is introduced into an electric carbon or graphite furnace, then melted and cast outside the furnace. The invention further comprises apparatus suitable for executing the said process.

The drawings show five forms of execution of furnaces used for carrying out the new process.

Fig. 1 is a vertical section through a carbon or graphite furnace according to the invention, Fig. 2 a section through the material part of a horizontal furnace, Fig. 3 a construction of a furnace which substantially corresponds to Fig. 1 but with the shank for the tool to be produced embedded in the casting mould.

Fig. 4 is a section through a horizontal furnace, and

Fig. 5 shows a melting mould such as can be used in connection with the furnace of Fig. 4.

In Figure 1 is shown a vertical carbon or graphite tube furnace 1b with current supply terminals 2b of carbon or graphite.

The furnace comprises an inner tube or lining 3b of carbon or graphite which is intended to receive moulded bodies 4b and to constitute the melting mould. The bottom of this melting mould is constituted by a wide funnel-shaped recess 5b which terminates in a casting channel 6b. The latter is continued in the immediately adjoining casting mould 7b of carbon or graphite which, in the construction shown in Fig. 1, is arranged outside the furnace. Fig. 1 shows further a cooling device 17 for the casting mould 7b. The cooling medium is admitted at $H^1$ and discharged at $H^2$.

Into the space between the tube 1b and the melting mould 3b is introduced through a conduit 8b a current of hydrogen which passes through the annular space 9b in the direction of the arrows and through openings 10b into the casting mould 3b, then rising in the narrow annular slot 11b it escapes from the furnace at the top. On the uppermost moulded body a carbon or graphite plunger 12b presses which can be loaded with a weight 13b or pressed down by gas, liquid or spring pressure. The funnel-shaped recess 5b is dimensioned in such a manner that the lowermost moulded body has only very slight contact (for instance edge contact) with the bottom of the melting mould, in order to reduce to a minimum the carbon absorption by the moulded body. The annular slot 11b serves the same purpose.

If the furnace according to Fig. 1 is used to produce the simple carbide ($W_2C$) of carbon in a thoroughly simple manner a pure highly reduced metallic tungsten is mixed with a suitable previously determinable quantity of finely ground carbon, and from the mixture the moulded or pressed bodies 4b are formed and introduced into the recess 5b. Thereafter the plunger 12b and the weight 13b are put on and then the electric circuit is closed and at the same time a current of hydrogen is introduced through the conduit 8b. When the pressed bodies are heated to melting temperature the material will at once flow into the cooled mould 7b. This flow into the mould is indicated or made visible by suitable means outside the electric furnace, whereupon the supply of current is shut off either at once or after the expiration of a predetermined period, so that a further or an excessive absorption of carbon by the liquid molded body when using a carbon or graphite casting mould, is avoided in a satisfactory manner.

The quantity of carbon to be added to the tungsten or other metal powder can be graduated at will. Generally it should be chemically equivalent to the quantity of the tungsten powder used, so that it would be just sufficient to convert the whole tungsten into tungsten carbide. In practice, this quantity must be empirically corrected to suit the kind, shape and size of the apparatus employed, as the moulded body generally absorbs carbon before, during and after the melting from the melting mould as well as from the casting mould. The quantity of this latter carbon can be deducted from the quantity of carbon to be added initially to the tungsten powder. But, as already stated, even pure tungsten powder alone could be used for forming the moulded bodies, according to the size, to the carbon absorption to be expected during the melting, and to the product that it is desired to obtain. In order to reduce to the last possible amount the carbon absorption during the melting and casting process, care is taken according to the invention, as already stated, to bring the moulded body into contact with the melting mould as far as possible only at the edges.

As a further means the invention provides for a quick cooling of the casting at the proper time, that is by cutting off the current at once or at an exactly predetermined time after the mass has completely run into the casting mould (instantaneous switching out, with or without a time relay) or by cooling the casting mould by arranging it outside the furnace or by separate energetic cooling by means of an effective cooling medium.

Experiments have shown that tungsten carbide ingots cast outside the furnace had an extraordinarily fine uniform noncrystalline structure, as the carbon absorption was not great enough to produce perceptible or large quantities of double carbide of a coarser structure.

If in the same process several moulded bodies of different compositions and different melting points are used, say in such a manner that the lowermost moulded body has the lowest melting point and admixtures which give it say the greatest ductility and toughness with the least hardness, and the uppermost moulded body has on the contrary the highest melting point and yields after melting and cooling, a product of greatest hardness but of least toughness, it will be possible to obtain by a single casting operation for example a tool having a ductile shank and a very hard but brittle cutting edge if the cutting edge is situated at the top of the mould. Care need only be taken that the various melting points are not too far apart, and that the composition of the moulded bodies varies very gradually.

Experiments carried out by the applicants have shown that the casting mould should be necessarily arranged inside the furnace. This is explained by the following which has been made for the first time by the applicants and transmitted to the practice.

Moulded bodies of pure tungsten melt only at about 3200° C. Since during the melting they absorb more and more carbon from the melting mould and at the same time are converted into liquid carbide forms, the melting point of which decreases with the increasing proportion of carbon (the double carbide (WC) with about 6% carbon has for example a melting point of only 2600° C.), the molten mass will be more and more superheated if the temperature of 3200° C. is maintained. To this must be further added the increase of temperature brought about by the heat released by the formation of the tungsten carbide. The molten mass therefore if the carbonization is continued to complete formation of a double carbide of tungsten, can be cooled down about 600° C. on its way to the casting mould situated outside the melting furnace, without becoming solidified. If however—and this is a further point of the invention—the molten mass is cast within the furnace, the absorption of carbon by the molten mass would continue and the mass becomes rapidly difficultly meltable or not meltable and tough. Besides the contents of carbon would be indeterminable. But even if the process is carried out in such a manner as to produce only the simple tungsten carbide, the superheating of the molten mass is such that it can be transferred without solidifying into the casting mould situated outside the melting furnace. A reduction of the melting point can even take place in the casting mould situated outside the melting furnace if the said mould is made of carbon or graphite and the incoming molten mass is still capable of absorbing carbon. In that way a slower or gradually retarded solidification and an excellent filling up of the mould is effected. Moreover, owing to the increase of volume by absorption of carbon, an extraordinarily compact casting free from blow holes is obtained, if care is taken by suitable means, for instance by embedding the carbon form in a steel mould or the like, to avoid any yielding by the carbon mould.

The above-mentioned process of superheating of the molten mass by the gradually increasing absorption of carbon, renders possible the utilization of all possible casting processes, more particularly of those which otherwise are fairly difficult to carry out (casting with hand crucibles, tapping processes etc.) It has been found particularly advantageous to use the centrifugal process well known per se which consists in the molten mass being exposed to the action of centrifugal forces with the result that the different ingredients of the molten mass become concentrically grouped in accordance with their specific gravities and are caused to solidify in that arrangement.

The carbon could also be supplied in the process in an entirely or partly combined manner by starting with tungsten bicarbide to which is added an equivalent, or approximately equivalent, quantity of finely pulverized metallic tungsten or finely pulverized tungsten mono-carbide according to the final product to be obtained.

By starting with tungsten bicarbide, it is reduced in the well known manner to the finest powder, and to the said powder is added the quantity of highly reduced metallic tungsten in powder form required for the conversion of the tungsten bicarbide into the tungsten monocarbide richer in metal, taking into account any free carbon that may be contained in the raw material, and the quantity of carbon unavoidably absorbed during the heating or during the melting.

The two powders are properly mixed together and either moulded in carbon moulds or formed into moulded or pressed bodies under strong pressure. They are thereupon introduced in a manner already described into an electric carbon tube furnace or graphite tube furnace with carbon or graphite terminals, and heated and melted until tungsten monocarbide is formed, whereupon immediately after the melting process, the casting is effected in pre-prepared moulds.

The process could also be modified by adding to the powdered tungsten carbide, instead of, or in addition to, metallic tungsten, a corresponding quantity of finely pulverized tungsten monocarbide, and by continuing in the same way, owing to which a product is obtained which is an alloy of tungsten monocarbide and tungsten bicarbide and has a finer, denser structure than the bicarbide, but without the otherwise unavoidable graphite separations.

In the processes catalytic metals could also be used which merely assist the carbon absorption or the carbon exchange.

Finally, other heavy metals and heavy metal carbides could be used preferably or exclusively as the raw material.

Whether starting from metallic tungsten powder or tungsten carbides, according to the desired properties of the final product, certain additions can be made to the molded bodies, which act either merely as additions, or merely as contact substances or both such as for example iron, tungsten, molybdenum, vanadium, chromium etc. Iron for instance acts chiefly as a catalytic substance and as a rule evaporates again at the beginning of the melting provided that the addition of iron or an equivalent metal is so small that the melting point does not sink much below that of tungsten. It acts on the contrary as an alloy component and does not evaporate when the iron addition is so large that the melting point is considerably reduced. (It is known that alloys have generally a lower melting point than that of the component having the highest melting point.) Molybdenum is carbonized and is found in the final product (sometimes with metallic molybdenum). Excess of tungsten imparts to the final product a greater strength, excess of vanadium a greater toughness. Such additions of vanadium are of particular importance for the manufacture of cutting tools of all kinds from tungsten etc. carbides, as in addition to great hardness the tools must possess also great toughness and ductility or malleability. The vanadium could be added either in the form of ferro-vanadium or of pure vanadium, and in that way a number of gradations in the hardness and toughness of the final product can be produced. In the case of ample addition of vanadium, the hard tungsten carbide crystals are in a way embedded in the ductile vanadium which forms so to say the tough cement for the single hard crystals and produces with them an alloy.

The action of the catalytic substances may also consist in purifying the raw materials employed from any impurities that may adhere to them such as for instance oxygen or oxide, that is to say the catalytic substances may act as fluxes or as reducing agents. The most important of such fluxes are certain light metals, for instance aluminium, magnesium, medium etc. Aluminium and magnesium more particularly are highly suitable for the purpose in question. When added in small percentages, they withdraw from the metal powders (tungsten etc.) used as the raw material, as well as from the other pulverized metal additions (for instance vanadium), the last traces of oxygen and form therewith oxides which evaporate below the temperature of the formation of the carbides, or, in the case of an insufficiently high temperature, float on the surface of the molten mass in the form of slag. The molten mass purified in this manner shows on solidifying a greater force of cohesion between the molecules, that is to say it has a greater strength and toughness. Preferably, however, the whole or the above-mentioned additions should not exceed 40% for, as the experiments of the applicants have shown, tungsten carbide alloys with less than 60% of tungsten, which no longer have any special hardness, that is to say their hardness must be first improved by other additions such as boron, titanium, chromium, cobalt, manganese which cause drawbacks such as brittleness etc. Additions of less than 40% are quite sufficient for the purpose under consideration, as in view of the high specific gravity of the metal (tungsten, molybdenum etc.) forming the carbide, and of the considerably lower specific gravity of the added metals, the volumetric proportion of the single components is a very favorable one. An alloy of about 60 per cent by weight of tungsten carbide and about 40 per cent by weight of vanadium, consists for instance of 66 per cent by volume of vanadium and 34 per cent by volume of tungsten carbide, so that more than a sufficient tough mass (vanadium) is available for the embedding of the very hard but very brittle tungsten carbide crystals. Even with an addition of vanadium of 10–20%, thoroughly ductile, tough and extremely hard alloys are obtained. It is merely intended to indicate here the actions of all these admixtures.

The process covers also the manufacture of other than tungsten carbides more particularly those of heavy metals such as molybdenum, titanium, uranium, chromium, as well as of boron, silicium carbides etc. which as is well known, also possess great hardness and high melting points. More particularly also the electric resistance properties of silicium carbides which as is known are used as heating bodies, can be graduated at will. Hitherto these silicium carbides were not obtained from the molten mass, but by a simple sintering process.

In Figure 2 the graphite tube furnace 1d is horizontal, and accordingly the arrangement of the moulding bodies 4d, melting mould 3d and casting mould 7d and graphite tube 3d' are arranged horizontally. The casting channels 6 and 6c are arranged vertically. The casting mould 7d is arranged outside the furnace.

Figure 3 shows another construction which corresponds substantially to Fig. 1. 14 is the embedded tube of ductile metal, 15 the carbon lining of the same, and 16 the mould for the tool or the hard cutting edge to be cast in the tube. The embedding could also be effected so that the cutting edge would be at the top, and the tube at the bottom. The other parts of this figure substantially correspond to Figure 1 and have the same reference numbers as the corresponding parts of this figure, with the addition of the letter e.

Another furnace still better complying with practical requirements and excellently adapted for carrying out the process on a large scale, is shown in Figure 4.

The material melted in the carbon or graphite tube furnace is here conveyed to a casting mould arranged at any desired point of the room, and having no functional or constructive connection with the furnace. In such a furnace it is possible not only to cast the molten material outside the furnace, but also to effect any desired number of meltings in a single furnace heat, which hitherto could not be done with any process or any apparatus. Moreover, the new process and the new apparatus enable the melting process to be accurately controlled optically, and the moment of casting or of the interruption of the melting to be correctly chosen. The chief advantage of the new apparatus is its unequalled simplicity, great accessibility and the possibility of watching it. The furnace chamber is constituted by a resistance tube 18 open at both ends and made of carbon or preferably graphite. Strong current supply terminals 19 made of carbon, or preferably graphite, are mounted on the two ends of the said tube. 20 are the current supply cables of which there may be only one, or several. 21 are the current return cables or cable. The whole is mounted in a sheet iron chamber 22 with a detachable cover 23 and a discharge valve 24 at the bottom which opens into a container 25 placed underneath. The inner space of the chamber 22 is filled with a suitable incombustible non-conducting loose mass, such as for instance carbon grains to such an extent that the resistance tube 18 is well covered with it. To one open end of the resistance tube 18 is connected a gas pipe 26 through which hydrogen or other neutral gas or gas suitable as the atmosphere for the melting process (for instance ammonia) is introduced during the melting process.

The melting crucible is constituted simply by a graphite rod 27 of a somewhat smaller diameter than the inside diameter of the resistance tube 18.

The upper face of this graphite rod is somewhat flattened and tapers downwards like a wedge towards the end, the end projecting out of the furnace in order to facilitate the observation of the end situated in the furnace and containing the melting mould 28.

The casting process is carried out as follows: A charge of the material to be melted is rammed in or pressed into the melting mould 28 of one or any desired number of graphite rods 27. The material to be melted is constituted either by pure tungsten powder or by tungsten powder mixed with a given quantity of carbon as described in the foregoing. Charges of tungsten carbides or tungstic acid anhydrides with the admixtures already mentioned, can be also treated in the furnace. Finally a small check block 29 formed from the same mass as the material to be melted (for instance under a press) is placed loosely on top of the filled melting mould.

In the meantime the resistance tube 18 is heated to a bright white heat in a few minutes by switching on the current, and a current of hydrogen is admitted through the pipe 26.

The first graphite rod 27 is then introduced into the tube 18 up to the position shown, and the required melting temperature (according to the composition of the material, as a rule 2700° to 3500° C.) is determined by means of the optical pyrometer 30. Preferably, the interference photometer or pyrometer of Lammer, or the optical pyrometer of Holborn Kurlbaum is used.

By observing the check block 29 by means of the optical pyrometer 30, it is possible to ascertain when the melting of the mass begins, which generally will be the case after 2–3 minutes. The mass is then left in the furnace for another period empirically determined beforehand, for instance 30 seconds, whereupon the graphite rod 27 (which can be conveniently gripped at its free end with asbestos gloves) is quickly pulled out and emptied into a casting mould prepared outside the furnace.

The next graphite rod with the charge is thereupon introduced into the furnace and so on.

According to the size and shape of the resistance tube 18, several graphite rods 27 could be introduced into the furnace simultaneously. It is however preferable to work with only one melting mould at a time, as it facilitates the watching of the melting mass.

The time of waiting, or the length of melting, from the beginning of the melting of the check block 29 to the removal of the melting mould 28 from the furnace, depends on the initial composition of the material as well as on the quantity and on the intended carbon absorption by the same. According to the proportions chosen, it is possible to obtain castings with various desired percentages of carbon and with different crystalline structure, from the product with absolutely fine grained (pearl-like structure) to coarse crystalline, fibrous or conchoidal fracture.

A fact which is of great importance for the proper carrying out of the process, has been further discovered by experiments namely that the molten mass if left too long in the furnace, is converted by excessive carbon absorption into a carbide which melts with great difficulty, or into an alloy very rich in carbon, which can no longer be cast, or no longer fills the casting moulds. The maintaining of the above-mentioned empirically determined melting time which gives an absolutely fluid molten mass which remains fluid even after the withdrawal from the furnace or becomes still more fluid owing to the reduction of the point of fusion and the consequent superheating, is therefore an important feature of the invention.

From the discoveries already set forth in the specification, according to which the material is gradually converted by the increasing carbon absorption into a highly superheated state and becomes more and more fluid, and from the further discovery that in the case of excessive carbon absorption, the product formed becomes again very difficult to melt and viscous, it follows further that the process here described, and the apparatus described are particularly suitable for melting large quantities of material, and for that reason appear to be more particularly adapted for industrial utilization, because the absorption of carbon by the molten material takes place through the surface of the same which surface increases as the square of the linear dimensions of the material while the carbon absorption increases as the cube of the linear dimensions. The time of waiting or melting that is to say the time required for the correct carbon absorption, calculated from the moment when the melting of the check block 29 is observed, to the withdrawal of the melting mould 28 from the furnace, is therefore always greater in the case of greater masses, namely in the proportion of the tube to the square of the linear dimensions of the melting mould 28. Consequently, for instance, with the edges of the melting mould 28 three times longer, the time of waiting for the carbon absorption and the consequent beginning of fluidity, will become greater in the proportion of 27:9, that is to say, three times greater. This makes it possible to graduate the carbon absorption exactly when manufacturing on a larger scale, and in that way always to obtain a uniform product of a composition exactly determined beforehand, or of the desired crystalline structure.

The replacing of a consumed resistance tube in a furnace according to Figure 4 can be effected very quickly and easily. It is merely necessary to open the bottom valve 24, whereupon the carbon grains surrounding the resistance tube 18 will drop into the container 25. The tube 18 is then simply pulled out and replaced by a new one, whereupon the cover 23 is opened, and the carbon grains in the container 25, again poured over the new tube 18 until it is completely covered by the said mass. The container 25 is then replaced under the furnace, and the process can begin again.

For the manufacture of large castings, the melting mould 31 can be made as shown in Figure 5. The mould 31 comprises a casting channel 34 and 35 leading out of the furnace and provided with a slight gradient downwards to convey the molten material 32 to the funnel 36 of a casting mould 37 arranged outside the furnace and preferably made of graphite or carbon and containing the mould 38 for the desired casting. When a melting mould according to Figure 5 is used, a tapping process could also be used. To that end the casting channel 35 is held closed for a time empirically determined beforehand, after the melting of the check block 33 and then opened by any desired tapping process. The mould situated outside the furnace moreover can be first heated and then cooled as required either temporarily or continuously, for instance in order to ensure the formation of a given crystalline shape or general texture.

We claim:

1. A process for manufacturing carbides of difficultly meltable metals which comprises in mixing at least one difficultly meltable metal with carbon, the metal being admixed in a quantity exceeding that required to form pure carbide, melting the mixture down in an electric carbon furnace and casting the molten mass outside said furnace at the moment of the correct degree of carburization.

2. A process for manufacturing carbides of difficultly meltable metals which comprises in mixing at least one difficultly meltable metal with carbon and at least one metal having a lower melting point and adapted to evaporate at least partially upon the mixture being molten and cast, melting the mixture down in an electric carbon furnace, and casting the molten mass outside said furnace at the moment of the correct degree of carburization.

3. A process for manufacturing carbides of difficultly meltable metals which comprises in mixing at least one difficultly meltable metal with carbon and at least one metal having a lower melting point and adapted to evaporate at least partially upon the mixture being molten and cast, at least one of the components, partaking in the carbide formation, of the mixture being admixed in a quantity exceeding that required to form pure carbide, melting said mixture down in an electric carbon furnace and casting the molten mass outside said furnace at the moment of the correct degree of carburization, the mixture being made in a manner causing the lower portion of the mixture, when introduced in said furnace to have a lower melting point than its upper portion.

4. A process for manufacturing carbides of difficultly meltable metals which comprises in mixing at least one difficultly meltable metal with carbon, melting the mixture down in an electric carbon furnace, and casting the molten mass outside said furnace at the moment of the correct degree of carburization which moment is determined by observing a check block of the same composition as the mass to be melted which block is introduced in the furnace together with the mass to be melted.

In testimony whereof we have affixed our signatures.

HERMANN VOIGTLÄNDER.
OTTO KAUFELS.